United States Patent [19]

Kennedy

[11] 3,773,973

[45] Nov. 20, 1973

[54] UNIVERSAL DATA-COMMUNICATIONS INTERFACE

[75] Inventor: James A. Kennedy, Phoenix, Ariz.

[73] Assignee: Honeywell Information Systems, Inc., Waltham, Mass.

[22] Filed: Aug. 3, 1971

[21] Appl. No.: 168,651

[52] U.S. Cl. ................................ 178/58 R, 179/2 C

[51] Int. Cl. ................................ H04l 5/14

[58] Field of Search.......................... 178/58, 59, 60; 179/2 R, 2 C, 1 C

[56] References Cited

UNITED STATES PATENTS

| | | | |
|---|---|---|---|
| 3,581,006 | 5/1971 | Wallace | 178/58 |
| 3,571,512 | 3/1971 | Quiros | 178/58 |
| 3,505,475 | 4/1970 | Carrone | 178/58 |
| 3,037,078 | 5/1962 | Higgins | 178/58 |
| 3,619,659 | 11/1971 | Meyer | 307/263 |
| 3,610,962 | 10/1971 | Meyer | 307/261 |

*Primary Examiner*—William C. Cooper
*Assistant Examiner*—David L. Stewart
*Attorney*—Lloyd B. Guernsey et al.

[57] ABSTRACT

A universal interface can be connected between a data-communications subchannel and either a modem or a teletypewriter. A switch in the interface causes the interface to provide signals which can be used by the modem when the switch is in a first position and causes the interface to provide signals which can be used directly by a teletypewriter when the switch is in a second position.

4 Claims, 6 Drawing Figures

PATENTED NOV 20 1973 3,773,973

SHEET 1 OF 3

INVENTOR
JAMES A. KENNEDY
BY Floyd B. Guernsey
AGENT

INVENTOR
JAMES A. KENNEDY
BY Lloyd B. Guernsey
AGENT

INVENTOR
JAMES A. KENNEDY
BY Lloyd B. Guernsey
AGENT

UNIVERSAL DATA-COMMUNICATIONS INTERFACE

BACKGROUND OF THE INVENTION

The present invention pertains to data-communications systems and more particularly to an interface which can be connected between a communications controller subchannel and a modem or between a communications controller subchannel and a teletypewriter. When a selector switch is open the interface develops signals which operate a first modem that is connected by a telephone line to a second modem and to a teletypewriter. When the selector switch is closed the interface develops signals which can operate a teletypewriter directly.

Electronic data processing has rapidly become a necessary adjunct to everyday business and provides not only means for calculating, accounting and general data processing, but also provides a source of business management information. To incorporate a data processing system into a business frequently requires a transmission for entry into the system over long distances. Terminal devices convert data from human readable form into binary form and transmit this data over wires or microwave relay systems from the terminal device to the data processor. The data processor operates upon the data received and sends a return message to the terminal device. The data processor operates at a speed which is many times as fast as the operating speed of the terminal devices. To provide efficient use of the data communications equipment a control module such as a communications controller is connected between the terminal devices and the data processor. The data is transmitted a bit at a time from the terminal devices to the subchannels which temporarily store the data and then send the data to the processor.

The terminal devices convert data from human readable form into binary ones and binary zeros where binary ones and zeros are represented by two different voltage levels. A first modem converts these different voltage levels into two different audio frequencies or tones and uses these different tones to transmit data over wires or microwave relay systems to a second modem near the data processor. The second modem converts the different tones into different voltage levels and delivers the data through an interface and a communications controller subchannel to the data processor. Other data from the processor is returned through the subchannel and interface to the second modem which converts the difference in voltage levels to different tones which are transmitted over wires or microwave relay systems to the first modem. The first modem converts the tones into different voltage levels for use by the terminal devices.

The interface converts monopolar signals from the subchannel into industry standard bipolar signals which are required to operate the modem. The interface also converts bipolar signals from the modem into monopolar signals which are required by the subchannel. The modems are electronic devices having high input impedances and high output impedances. The interface must have relatively high input and output impedances and provide signals having standard voltages and very low values of current. When it is desired to connect a subchannel to a teletypewriter or other terminal device which is positioned near the processor, prior art systems must use a modem or a special adapter to match the subchannel to the teletypewriter. The modems are expensive. The teletypewriters are low impedance devices requiring much larger values of current than are required by the modems. Also the currents required by the teletypewriters are monopolar rather than the bipolar voltages required by the modems. What is needed is an interface which can be connected to a subchannel and to either a modem or a teletypewriter. The present invention provides a universal interface which can be connected to a subchannel and which has a switch that adapts the interface to provide the desired signals for either a modem or for a teletypewriter directly. When the switch is in a first position the interface converts the signals from the subchannel into signals which are used by the modem to produce the tones as described above. When the switch is in a second position the interface converts the signals from the subchannel into signal currents which operate the teletypewriter without using a modem.

The interface has a circuit which prevents signals that are sent from the interface to the teletypewriter from reflecting back to the interface and producing an echo. This circuit which prevents echoes does not prevent "line-break" signals from being received by the interface when the interface is sending data to the teletypewriter. A line-break signal is a signal which allows the teletypewriter to interrupt the computer or to send a signal to the computer while the computer is sending data to the teletypewriter. A line-break signal is also produced when a physical break occurs in a line between the interface and the terminal device.

It, therefore, is an object of this invention to provide an interface which converts signals from a communications controller subchannel into signals which can be used by a modem or can be used directly by a teletypewriter.

Another object of this invention is to provide an interface having a circuit which prevents echoes.

A further object of this invention is to provide an interface having a circuit which prevents echoes but which allows line-break signals to be sent from a terminal device to the subchannel.

SUMMARY OF THE INVENTION

The foregoing objects are achieved in accordance with one embodiment of the present invention by employing an interface which can be connected between the data-communications subchannel and either a modem or a teletypewriter. A switch in the interface causes the interface to provide signals which can be used by the modem when the switch is in a first position and causes the interface to provide signals which can be used directly by the teletypewriter when the switch is in a second position. A circuit in the interface prevents echoes but allows a terminal device to send line-break signals to the subchannel.

Other objects and advantages of this invention will become apparent from the following description when taken in connection with the accompanying drawings.

DESCRIPTION OF THE PREFERRED EMBODIMENT

Since the present invention pertains to data processing and to data communication techniques, a description thereof can become very complex; however, it is believed unnecessary to describe all of the details of the data-communications system to completely describe the present invention. Therefore, most of the details that are relatively well-known in the art will be omitted from this description. Even though details will be eliminated a basic description will be given of the entire system to enable one skilled in the art to understand the environment in which the present invention is placed. Accordingly, reference is made to FIG. 1 showing a simplified block diagram of a data-communications system which uses the present invention.

Figure 1:
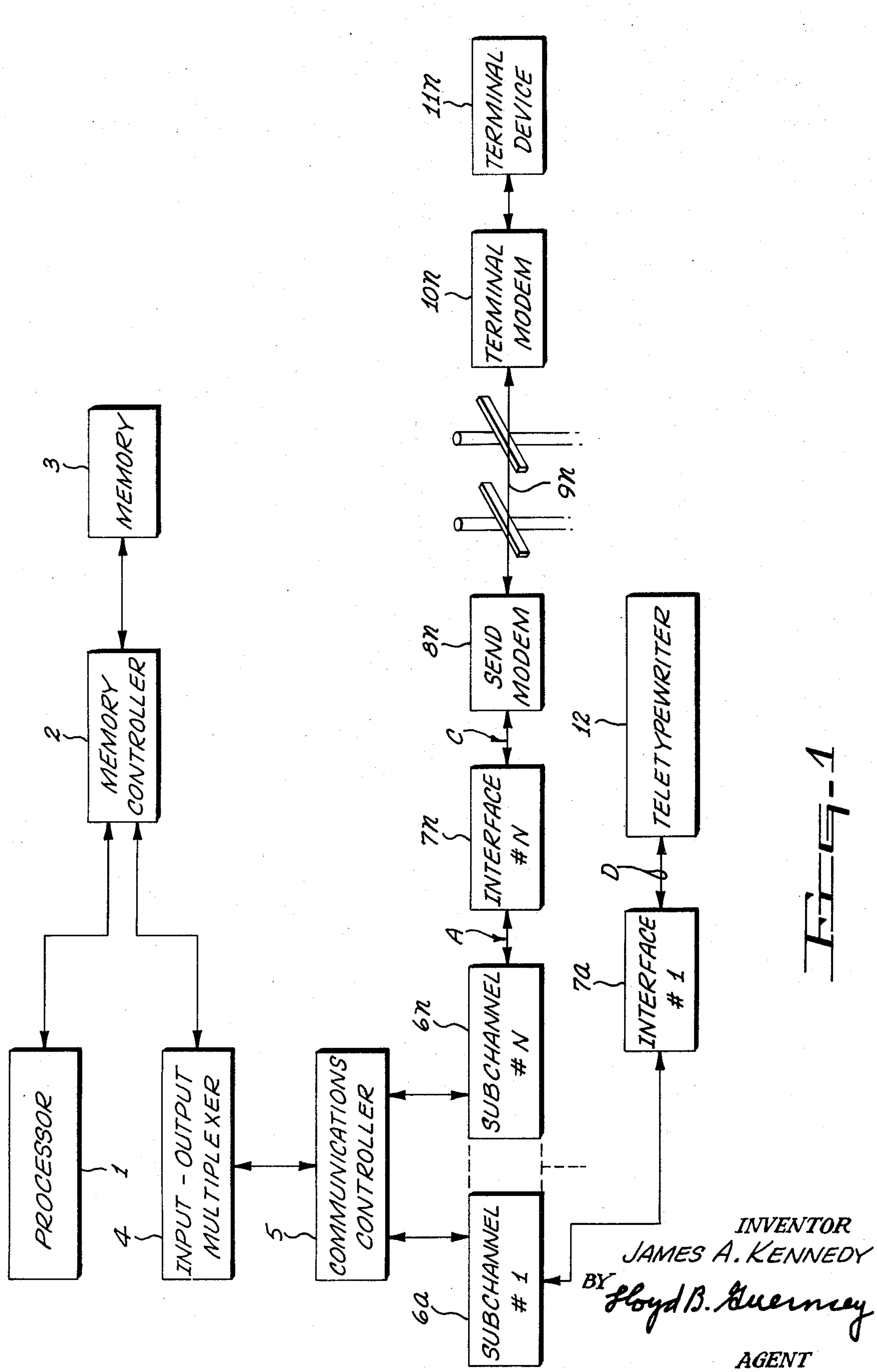
FIG. 1 is a simplified block diagram of a data-communications system in which the present invention may be used.

The data-communications system shown in FIG. 1 includes a data processor 1, a memory controller 2, a memory device or memory 3, an input/output multiplexer 4, a communications controller 5 having a plurality of subchannels 6*a*–6*n*, and a plurality of interfaces 7*a*–7*n*. The data processor 1 shown in FIG. 1 manipulates data in accordance with the instructions of a program which may be stored in memory. The processor receives an instruction, decodes the instruction and performs the operation indicated thereby. The operation is performed upon data received by the processor and temporarily stored thereby during the operation. The series of instructions is called a program and includes decodable operations to be performed by the processor. The instructions of the program are obtained sequentially by the processor and together with the data to be operated upon, are stored in the memory device. The memory device 3 shown in FIG. 1 may form many of several well-known types; however, most commonly the main memory is a random access coincident-current type having a plurality of discrete addressable locations each of which provides storage for a word. The word may form data or instructions and may contain specific fields useful in a variety of operations. Normally, when the processor is in need of data or instructions, it will generate a memory cycle and provide an address to the memory. The data or words stored at the address location will subsequently be retrieved from memory 3 and provided to the data processor 1.

A series of instructions comprising a program is usually "loaded" into the memory at the beginning of the operation and thus occupies a "block" of memory which normally must not be disturbed until the program has been completed. Data to be operated upon by the processor in accordance with instructions of the stored program is stored in memory and is retrieved and replaced in accordance with binary coded instructions.

Communications with the data processing system usually takes place through the media of input/output devices such as magnetic tape handlers, paper tape readers, punch card readers, and remote terminal devices. To control the receipt of information from input/output devices and to coordinate the transfer of information to and from such devices, an input/output control means is required. Thus an input/output controller or input/output multiplexer is provided and connects the data processing system to the variety of input/output devices. The input/output multiplexer coordinates the information flow to and from the various input/output devices and also awards priority when more than one input/output device is attempting to communicate with the data processing system. Since input/output devices are usually electromechanical in nature and necessarily have operating speeds which are much lower than the remainder of the data processing system, the input/output multiplexer provides buffering or temporary storage to enable the processing system to proceed at its normal rate without waiting for the time consuming communication with the input/output device.

Binary information which may be supplied from the memory to one of the subchannels 6*n*, is changed to the proper voltage level by the interface 7*n* and is converted by the send modem 8*n* into modulated information which may be sent over telephone lines 9*n* to the terminal modem 10*n*. The terminal modem converts the modulated information into binary information for use by the terminal device 11*n*. Binary information which is generated by one of the terminal devices such as 11*n* is converted by the terminal modem 10*n* into modulated information which is sent over the telephone lines to the corresponding send modem 8*n*, which converts information into binary information again for use by the corresponding subchannel 6*n*. The end modems and the terminal modems may either receive modulated information and convert the modulated information into binary information or they may receive binary information and convert it into modulated information.

The input/output multiplexer shown in FIG. 1 may have a plurality of input/output devices connected to the input/output multiplexer or input/output controller in the same manner as FIG. 1 of U.S. Pat. No. 3,413,613 by Bahrs et al. The communications controller 5 shown in applicant's FIG. 1 appears to the input/output multiplexer 4 to be an input/output device, but this communications controller in turn controls a plurality of subchannels which may be connected through interfaces, modems and telephone lines to terminal devices.

For a complete description of the processor of FIG. 1 and the instant invention which is embodied in such a processor, reference is made to the above U.S. Pat. No. 3,413,613 issued to Bahrs et al. Memory device 3 may be one of the types disclosed in U.S. Pat. No. 3,521,240 issued to David L. Bahrs, John F. Couleur, and Albert L. Beard. A more complete description of the operation of a data-communications system is disclosed in a U.S. Pat. No. 3,618,031 by James A. Kennedy, Aldis Klavins, and Robert J. Koegel entitled "Data Communication System," filed on June 29, 1970.

Figure 2A:
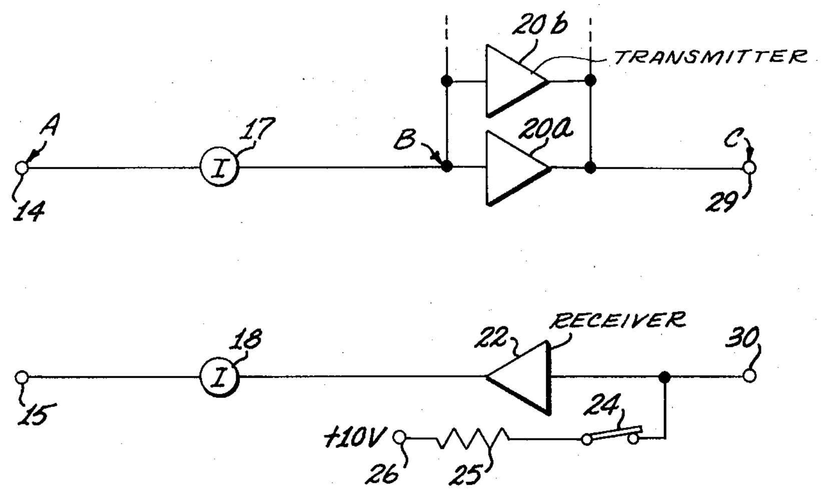
FIG. 2*a* is a block diagram of an interface constructed in accordance with the teaching of the present invention.

The universal interface shown in FIG. 2*a* includes a pair of inverters 17 and 18, a bipolar transmitter 20*a*, a bipolar receiver 22, a switch 24, and a resistor 25. The subchannels operate in a four-wire mode. Output signals from the subchannel are applied to terminal 14 of the interface while signals from the interface are applied to terminal 15. On the other hand, the terminal devices operate in a two-wire mode. Signals from the interface to the terminal device and signals from the terminal device to the interface follow a path between terminals 29 and 30. Signals from a communications controller subchannel of the type shown in FIG. 1 are applied to input terminal 14 where they are inverted by inverter 17 and applied to the input of the bipolar transmitter 20*a*. A signal waveform of the type which may be received at input terminal 14 is shown in waveform A of FIG. 5. Waveform A is a standard signal that is used in teletypewriter circuits where a mark is represented by a positive voltage such as +4 volts and a space is represented by a value of zero volts. When data is not being transmitted from the subchannel to a teletypewriter the signal at input terminal 14 is a continuous positive voltage having the same value as a mark. Each character begins with a start bit having a value of zero volts followed by a combination of five or more bits which comprise the particular character being transmitted. Each character ends with a stop bit having the same positive value as a mark.

INVERTER

The inverter disclosed in FIG. 2*a* and represented by numerals 17 and 18 provides a positive output signal when the input signal applied thereto has a value of zero volts, and conversely the inverter provides a zero value of output signal when the input signal applied thereto is positive. Typical input signals and output signals at inverter 17 are shown in waveform A and waveform B respectively of FIG. 5.

BIPOLAR TRANSMITTER

Figure 3:
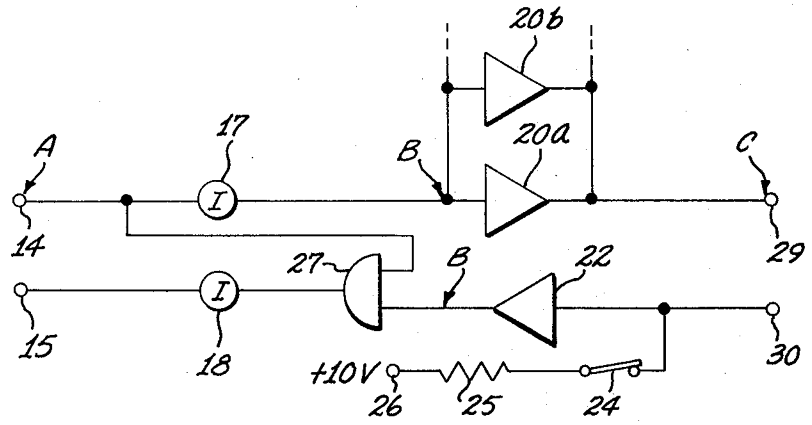
FIGS. 3 and 4 show other embodiments of an interface constructed in accordance with the teaching of the present invention.
Figure 4:
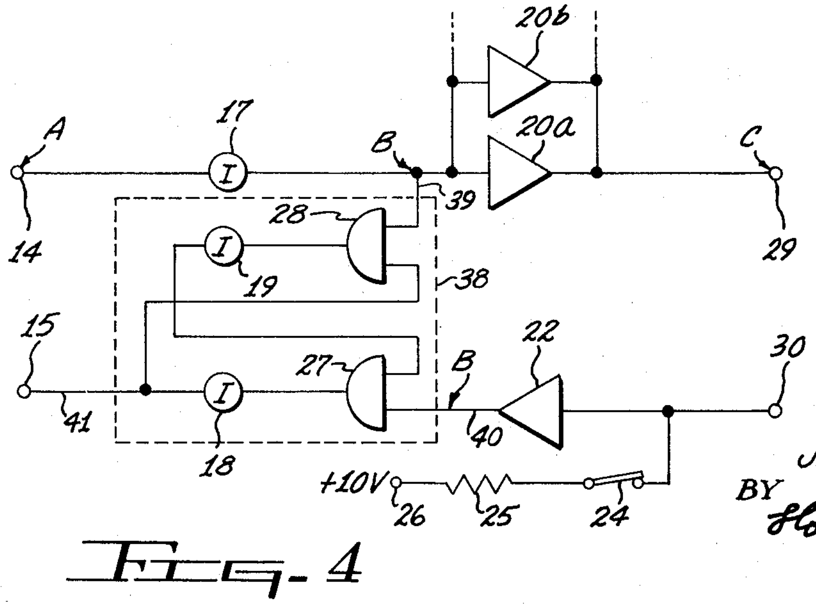

The bipolar transmitter disclosed in the drawings and particularly in FIGS. 2*a*, 3 and 4 provides standard signals which are usable by modem in the circuit shown in FIG. 1. When positive signals are applied to the input lead of the bipolar transmitter the bipolar transmitter provides a signal of approximately +10 volts at the output lead. When a signal having a value of zero volts is applied to the input lead the bipolar transmitter provides a signal of approximately −10 volts at the output lead. A more complete description of the operation of the bipolar transmitter is disclosed in a U.S. Pat. No. 3,619,659 by Bernhardt H. Meyer and Robert R. Greenwood, entitled "Integrator Amplifier Circuit with Voltage Regulation and Temperature Compensation," now U.S. Pat. No. 3,619,659, issued Nov. 9, 1971.

BIPOLAR RECEIVER

The bipolar receiver disclosed in the drawings and particularly in FIGS. 2*a*, 3 and 4 converts the voltages shown in waveform B into the voltages shown in waveform A. For example, when a +10 volts is received at the input lead of the bipolar receiver 22 a +4 volts is developed at the output lead. When a −10 volts is received at the input lead of bipolar receiver 22 a value of zero volts is provided at the output lead. A more complete description of the bipolar receiver is disclosed in a U.S. Pat. No. 3,610,962 by Bernhardt H. Meyer and Bruce C. Keene, entitled "Bipolar Receiver," now U.S. Pat. No. 3,610,962, issued Oct. 5, 1971.

AND-GATES

The AND-gates disclosed in the drawings and particularly in FIGS. 3 and 4 provide the logical operation of conjunction of binary signals applied thereto. In the system disclosed the AND-gates provide the positive output signal when, and only when, both of the input signals applied thereto are positive. The symbols identified by the numerals 27 and 28 represent two input AND-gates. When either or both of the input signals applied to the AND-gate has a zero value of voltage the output of the AND-gate will have a zero value of voltage.

Figure 5:
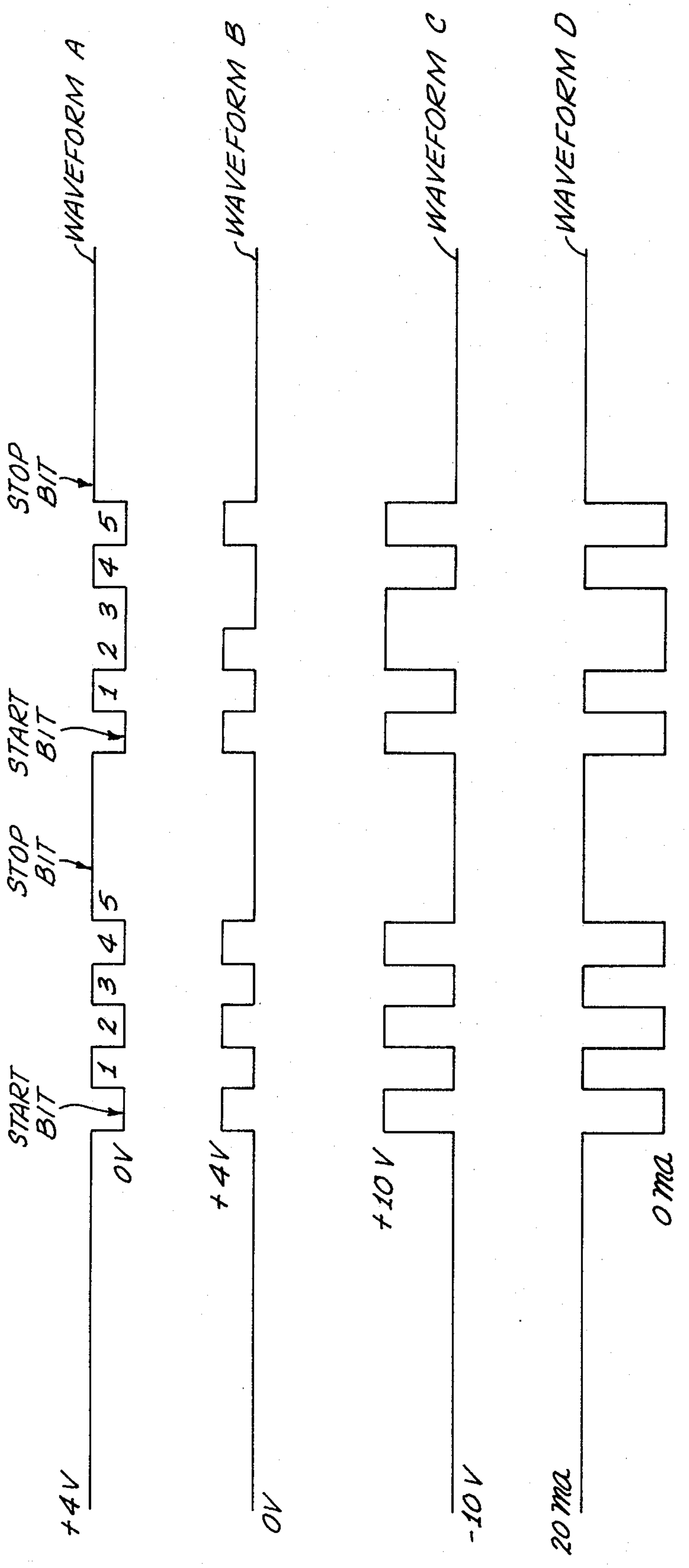
FIG. 5 illustrates waveforms which are useful in explaining the operation of the invention shown in FIGS. 2*a*, 3 and 4.

The operation of the universal interface shown in FIG. 2*a* will now be described in connection with the data-communications system shown in FIG. 1 and the waveforms shown in FIG. 5. The waveform A of FIG. 5 illustrates the signals which are provided from the subchannels of FIG. 1 to the interface 7*a*–7*n*. At the output terminal of the subchannels a mark is represented by a +4 volts and a space is represented by a zero value of voltage. The signal levels which are required at the input of the send modem 8*n* are shown in waveform C. At the input lead of the send modem 8*n* a mark is represented by a −10 volts and a space is represented by a +10 volts. The current required by the teletypewriter 12 in FIG. 1 is shown in waveform D of FIG. 5. A current value of 20 milliamperes or 20ma is required to provide a mark signal to the teletypewriter and a current value of zero is required to provide a space to the teletypewriter.

The signal shown in waveform A is inverted by inverter 17 to the signal shown in waveform B and applied to the input lead of the bipolar transmitter 20*a*. The bipolar transmitter converts the signal shown in waveform B to the signal shown in waveform C of FIG. 5. The signal shown in waveform C is the industry standard signal which is required to operate a modem so that the input terminal of a modem may be connected to output terminal 29. The output terminal of the modem may be connected to the input terminal 30 of FIG. 2*a*.

Figure 2B:
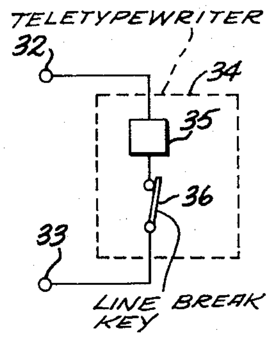
FIG. 2*b* is a simplified circuit of a teletypewriter.

It is also desired that the interface of the type shown in FIG. 2*a* develop signal currents which allow the interface to be connected directly to a teletypewriter of the type shown in FIG. 2*b*. The teletypewriter 34 includes a block 35 and a line-break key 36. The block 35 includes a selector mechanism for a page printer, a paper tape punch, a set of keyboard contacts and a set of paper tape reader contacts. The teletypewriter requires 20ma of current when a mark is received and a current of zero ma when a space is received. It is desired that the voltage waveform C at terminal 29 be used to supply the current waveform D to the teletypewriter. When switch 24 of FIG. 2*a* is closed the interface converts the voltage at terminal 29 into the current required by the teletypewriter.

When the interface is used with a teletypewriter the output terminal 29 of FIG. 2*a* is connected to terminal 32 of FIG. 2*b* and input terminal 30 is connected to terminal 33. When switch 24 is closed a +10 volts from terminal 26 is coupled through resistor 25 to the output terminal 30. Thus, when a +10 volts is applied to terminal 29 the current through the teletypewriter has a value of zero representing a space. When a −10 volts representing a mark is applied to terminal 29 the voltage at terminal 29 and the +10 volts at terminal 26 causes a current of 20 mils to flow from terminal 26 through resistor 25 and the teletypewriter 34 to terminal 29 thereby providing the current which represents a mark. In order to provide sufficient current for the teletypewriter it may be necessary to connect one or more additional bipolar transmitters in parallel with transmitter 20*a*.

Echo signals returning from the teletypewriter to terminal 15 of the communications controller subchannel may produce interfering signals in the subchannel. For example, when a start bit of zero volts is supplied to terminal 14, a +10 volts is developed at output terminal 29 and at terminal 30. This +10 volts is converted by receiver 22 and inverter 18 to a signal of zero volts at input terminal 15. When a mark of +4 volts is supplied to terminal 14, a −10 volts is developed at output terminal 29. The impedance of the teletypewriter block 35 is much lower than the value of resistor 25 so that most of the voltage between terminal 26 and terminal 29 is dropped across resistor 25. A −10 volts at terminal 29 produces approximately −10 volts at terminal 30. The −10 volts at terminal 30 is converted by receiver 22 and inverter 18 to a +4 volts at terminal 15. Thus, any signal at output terminal 14 returns as an echo to input terminal 15.

The interface shown in FIG. 3 includes a circuit which eliminates the echo. An AND-gate 27 connected between receiver 22 and inverter 18 acts as an electronic switch to eliminate echoes of signals from terminal 14 but it allows signals from the teletypewriter to be received at input terminal 15 when the subchannel is not sending data to the teletypewriter. The signals supplied to terminal 14 by the subchannel and the return signal from the output lead of receiver 22 are applied to the input leads of AND-gate 27. When the signal from terminal 14 is positive the signal from the output lead of receiver 22 has a value of zero volts so that the gate 27 is disabled by the signal on the lower lead of gate 27. When the signal from terminal 14 has a value of zero volts the gate 27 is disabled by the signal on the upper lead of gate 27. Thus, when the subchannel is sending data to terminal 14 the gate 27 is always disabled and echoes cannot pass through the gate to input terminal 15 of the subchannel. The voltage at the output lead of gate 27 has a steady value of zero volts. The signal at the output lead of gate 27 is inverted by inverter 18 so that the voltage at the input terminal 15 of the subchannel has a steady value of +4 volts. When teletypewriter 34 is sending data to the subchannel a −10 volt is applied to terminal 29. When the key 36 is closed the voltage at terminal 30 of FIG. 2*a* is approximately −10 volts as impedance of the teletypewriter 34 is low. When the key 36 is open and voltage at terminal 30 is +10 volts. These −10 volts and +10 volt signals are coupled through receiver 22 to the input terminal 15 of the subchannel.

When the subchannel is not sending data to the teletypewriter the voltage at output terminal 14 is a +4 volts so that AND-gate 27 is enabled and signals from the teletypewriter are transferred to input terminal 15 of FIG. 3. One of the signals which may be sent to the subchannel is a line-break signal. A line-break signal comprises a steady signal of zero volts at the input terminal 15 of the subchannel. When switch 36 of FIG. 2*b* is opened or when a lead to the teletypewriter opens a +10 volts from terminal 26 is coupled to the input lead of receiver 22. This +10 volts is converted to a +4 volts by receiver 22 and applied to the lower lead of AND-gate 27. Gate 27 is enabled by the +4 volts from terminal 14 so that a +4 volts is coupled to the input lead of inverter 18. The +4 volts is inverted by inverter 18 to a zero voltage signal and applied as a steady line-break signal to input terminal 15.

When the subchannel is sending data to the teletypewriter a line-break signal cannot be received by the subchannel as gate 27 is being enabled and disabled by the signal at terminal 14 so that a steady signal cannot be coupled through this gate.

It may be desirable for an operator of a teletypewriter to send a "line-break" signal to the subchannel to interrupt the sending of a message from the subchannel or it may be desirable to report that a line from the interface to the teletypewriter has been broken. An embodiment of the present invention which can send line-break signals to the subchannel and interrupt the sending of a message is shown in FIG. 4. This embodiment also prevents echoes.

Echoes are prevented by inverters 18 and 19 and AND-gates 27 and 28. This pair of inverters and pair of gates form a D.C. flip-flop or bistable device 38 having input leads 39 and 40 and an output lead 41. When the subchannel provides a positive signal at terminal 14 inverter 17 provides a zero voltage at the upper lead of AND-gate 28 so that the output lead of gate 28 has a zero value of voltage. This zero voltage is inverted to a positive voltage by inverter 19 and applied to the upper lead of gate 27. The zero voltage from the output lead of inverter 17 is converted to a −10 volts by bipolar transmitter 20*a* and coupled through the teletypewriter to terminal 30. The −10 volts at terminal 30 is converted to zero volts by receiver 22 and produces zero volts at the output lead of gate 27. The zero volts at the output lead of gate 27 is inverted by inverter 18 to a +4 volts at input terminal 15 of the subchannel.

When the subchannel changes to a zero value of signal at output terminal 14 this signal is inverted to a +4 volts by inverter 17 and applied to the upper lead of gate 28. The signal from the output lead of inverter 17 is delayed by transmitter 20*a*, by the leads to the teletypewriter, by the leads from the teletypewriter to the receiver 22 and by the receiver so that voltage at the input terminal 15 is a +4 volts when the signal at terminal 14 changes. The +4 volts at terminal 15 and the +4 volts on the upper lead of gate 28 provide a +4 volts at the output lead of gate 28. The +4 volts at the output lead of gate 28 is inverted to a zero voltage by inverter 19. The zero voltage from inverter 19 causes AND-gate 27 to be disabled so that the voltage on the output lead is zero. This zero value of voltage is inverted to a +4 volts by inverter 18 and applied to input terminal 15 of the subchannel. AND-gate 27 remains disabled after the signal returns from the teletypewriter. Thus, the voltage at input terminal 15 remains at +4 volts while signals are transmitted from the subchannel to the teletypewriter. The echoes are eliminated as long as the line-break switch 36 is closed and the lines to the teletypewriter are unbroken.

When the line-break switch 36 is open a +10 volts at the input lead of receiver 22 is converted to a +4 volts and coupled to the lower lead of AND-gate 27. The data signals at terminal 14 change from zero volts to a +4 volts as shown in waveform A of FIG. 5. When a +4 volt signal is received at terminal 14 the inverter 17 converts the signal to a zero volts. The zero voltage signal applied to the upper lead of AND-gate 28 produces zero volts at the input lead of inverter 19. Inverter 19 converts the zero volt signal to a +4 volts at the upper input lead of gate 27 thereby enabling gate 27 so that the voltage at the output lead of gate 27 is a +4 volts. The +4 volts is inverted to a value of zero volts by inverter 18 and disables gate 28. The signal from inverter 18 keeps gate 28 disabled as long as a +10 volts remains at the input lead of receiver 22. While gate 28 is disabled a line-break signal having a steady value of zero volts is coupled to the input terminal 15 of the subchannel. Thus, the embodiment shown in FIG. 4 prevents echoes while data is being received by the teletypewriter, but allows line-break signals to interrupt the sending of a message by the subchannel.

While the principles of the invention have now been made clear in an illustrative embodiment, there will be many obvious modifications of the structure, proportions, materials and components without departing from those principles. The appended claims are intended to cover any such modifications.

What is claimed is:

1. A universal data-communications interface for connecting a processor subchannel to a data device having first and second input terminals where the data device can be either one of the following: a teletypewriter and a modem, said subchannel having an input terminal and an output terminal, said interface including:

first and second inverters each having an input lead and an output lead;

a bipolar transmitter having an input lead and an output lead, said first inverter being connected between said output terminal of said subchannel and said input lead of said transmitter, said output lead of said transmitter being connected to said first input terminal of said device;

a bipolar receiver having an input lead and an output lead, said input lead of said receiver being connected to said second input terminal of said device;

an electronic switch having an input lead, a control lead and an output lead, said control lead of said electronic switch being connected to said output terminal of said subchannel, said input lead of said electronic switch being connected to said output lead of said receiver, said output lead of said electronic switch being connected to said input lead of said second inverter, said output lead of said second inverter being connected to said input terminal of said subchannel;

a switch having first and second terminals;

a resistor; and a reference potential, said resistor being connected between said potential and said first terminal of said switch, said second terminal of said switch being connected to said input lead of said receiver.

2. A universal data-communications interface as defined in claim 1 wherein said electronic switch includes:

an AND-gate having first and second input leads and an output lead, said output lead of said gate being connected to said input lead of said second inverter, said first input lead of said gate being connected to said output lead of said receiver, said second input lead of said gate being connected to said output terminal of said subchannel.

3. A universal data-communications interface for connecting a processor subchannel to a data device having first and second input terminals where the data device can be either one of the following: a teletypewriter and a modem, said subchannel having an input terminal and an output terminal, said interface comprising:

first, second and third inverters;

a bipolar transmitter having an input lead and an output lead, said first inverter being connected between said output terminal of said subchannel and said input lead of said transmitter, said output lead of said transmitter being connected to said first input terminal of said device;

first and second AND-gates each having first and second input leads and an output lead;

a bipolar receiver having an input lead and an output lead, said input lead of said receiver being connected to said second input terminal of said device, said second inverter being connected between said input lead of said subchannel and said output lead of said first gate, said output lead of said receiver being connected to said first input lead of said first gate, said third inverter being connected between said output lead of said second gate and said second input lead of said first gate, said first input lead of said second gate being connected to said input lead of said transmitter, said second input lead of said second gate being connected to said input terminal of said subchannel;

a switch having first and second terminals;

a resistor; and a reference potential, said resistor being connected between said potential and said first terminal of said switch, said second terminal of said switch being connected to said input lead of said receiver.

4. A universal data-communications interface for connecting a processor subchannel to a data device having first and second input terminals where the data device can be either one of the following: a teletypewriter and a modem, said subchannel having an input terminal and an output terminal, said interface comprising:

an inverter having an input lead and an output lead;

a bipolar transmitter having an input lead and an output lead, said inverter being connected between said output terminal of said subchannel and said input lead of said transmitter, said output lead of said transmitter being connected to said first input terminal of said device;

a bipolar receiver having an input lead and an output lead, said input lead of said receiver being connected to said second input terminal of said device;

A D.C. flip-flop having first and second input leads and an output lead, said output lead of said flip-flop being connected to said input terminal of said subchannel, said first input lead of said flip-flop being connected to said input lead of said transmitter, said second input lead of said flip-flop being connected to said output lead of said receiver;

a switch having first and second terminals;

a resistor; and a reference potential, said resistor being connected between said potential and said first terminal of said switch, said second terminal of said switch being connected to said input lead of said receiver.

* * * * *